US009658685B2

(12) United States Patent
Osaragi et al.

(10) Patent No.: US 9,658,685 B2
(45) Date of Patent: May 23, 2017

(54) THREE-DIMENSIONAL INPUT DEVICE AND INPUT SYSTEM

(71) Applicant: Kabushiki Kaisha TOPCON, Tokyo-to (JP)

(72) Inventors: Kazuki Osaragi, Tokyo-to (JP); Fumio Ohtomo, Saitama (JP); Masayuki Momiuchi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 14/950,485

(22) Filed: Nov. 24, 2015

(65) Prior Publication Data

US 2016/0154457 A1  Jun. 2, 2016

(30) Foreign Application Priority Data

Dec. 2, 2014  (JP) .................................. 2014-243757

(51) Int. Cl.
*G06F 3/033* (2013.01)
*G06F 3/01* (2006.01)
*G06F 3/03* (2006.01)
*G06F 3/0354* (2013.01)
*G06F 3/0481* (2013.01)

(52) U.S. Cl.
CPC ............ *G06F 3/011* (2013.01); *G06F 3/0304* (2013.01); *G06F 3/03542* (2013.01); *G06F 3/04815* (2013.01)

(58) Field of Classification Search
USPC ......................................................... 345/179
See application file for complete search history.

(56) References Cited

U.S. PATENT DOCUMENTS

| 8,836,768 B1 | 9/2014 | Rafii et al. |
| 2009/0251661 A1 | 10/2009 | Fuziak |
| 2010/0156787 A1 | 6/2010 | Katayama |
| 2014/0225918 A1 | 8/2014 | Mittal et al. |
| 2014/0266988 A1 | 9/2014 | Fisher et al. |
| 2015/0260990 A1 | 9/2015 | Ueno et al. |

FOREIGN PATENT DOCUMENTS

| JP | 9-179062 A | 7/1997 |
| JP | 2000-29621 A | 1/2000 |
| JP | 2000-102036 A | 4/2000 |
| JP | 2010-145860 A | 7/2010 |
| WO | 2014/050959 A1 | 4/2014 |

OTHER PUBLICATIONS

European communication dated Apr. 26, 2016 in corresponding European patent application No. 15194015.2.

*Primary Examiner* — Gustavo Polo
(74) *Attorney, Agent, or Firm* — Nields, Lemack & Frame, LLC

(57) ABSTRACT

A three-dimensional input device, which comprises two optical measuring means as set at a predetermined interval from each other, and for measuring a three-dimensional position of an object to be measured at a real time based on a direction of an object to be measured as obtained individually by the two optical measuring means and the predetermined interval and also has a three-dimensional position detecting device which is capable of being mounted on a human body, and a control unit, wherein the control unit generates input information based on change and mode of change of three-dimensional position of the object to be measured.

7 Claims, 7 Drawing Sheets

● REAR
○ COINCIDENCE
◉ THIS SIDE

● REAR
○ COINCIDENCE
◉ THIS SIDE

THREE-DIMENSIONAL INPUT DEVICE AND INPUT SYSTEM

BACKGROUND OF THE INVENTION

The present invention relates to a three-dimensional input device and an input system for inputting data to an information processing system or the like.

In recent years, information terminals such as a laptop computer, a tablet, etc., have been propagated, and these information terminals are now being used not only in office rooms but also in vehicles, and the input means in these information terminals are normally designed, to be operated by key operation or via touch panel. Voice input is used in some of these information terminals, while input is performed mostly by hands because the voice input is rather limited in comparison with the case of manual operation.

Machine body must be supported by an operator in key operation or touch panel operation. For this reason, these information terminals cannot be operated by a single hand, and these information terminals have caused restrictions on the place and the situations to be used.

SUMMARY OF THE INVENTION

It is an object of the present invention to provide a three-dimensional input, device and an input system, by which it is possible to perform operation regardless of the place to use and the condition to use.

To attain the object as described above, a three-dimensional input device according to the present invention, which comprises two optical measuring means as set at a predetermined interval from each other, and for measuring a three-dimensional position of an object to be measured at a real time based on a direction of an object to be measured as obtained, individually by the two optical measuring means and the predetermined interval and also has a three-dimensional position detecting device which is capable of being mounted on a human body, and a control unit, wherein the control unit generates input information based on change and mode of change of three-dimensional position of the object to be measured.

Further, in the three-dimensional input device according to the present invention, the control unit sets up a virtual reference plane, and generates an input information based on change and mode of change of a three-dimensional position of the object to be measured with respect to the virtual reference plane.

Further, in the three-dimensional input device according to the present invention, the control unit detects a body segment of human body, sets up working space by taking the body segment as a reference, and the virtual reference plane is set in the working space.

Further, in the three-dimensional input device according to the present invention, the object to be measured fulfills function as an input tool, a part of the input, tool has such a color or a shape as identifiable from the other parts or being able to emit a light.

Further, an input system according to the present invention comprises the three-dimensional input device and a display device, wherein the control unit displays a virtual reference plane on the display device and displays a positional information of the object to be measured with respect to the virtual, reference plane by overlapping on the virtual reference plane.

Further, in the input system according to the present invention, a three-dimensional position measurement of the object to be measured is executed within the working space.

Further, in the input system according to the present invention, the object to be measured fulfills the function as an input tool, a part of the input tool has such a color or a shape as identifiable from the other part of the input tool, or is capable of emitting a light.

Further, in the input system according to the present invention, display on the display device is 3D display.

Further, in the input system according to the present invention, the display device is capable of being mounted on human body together with the three-dimensional position detecting device.

Further, in the input system according to the present invention, the display device is designed as transmission type, the object to be measured as visually seen via the display device is overlapped on a virtual reference plane as displayed on the display device by the control unit, and the virtual reference plane and the object to be measured are associated with each other based on a three-dimensional position of the object to be measured as measured by the three-dimensional position detecting device.

Further, in the input system according to the present invention, in a case where a part where the object to be measured and a virtual reference plane are overlapped on each other, a part where the virtual reference plane is overlapped is processed by hidden-Mine processing.

Further, in the input system according to the present invention, the three-dimensional position detecting device is capable of being mounted on a head of an operator, and the display device is designed so that the display device is capable of being folded and stored.

Furthermore, in the input system according to the present invention, the three-dimensional position detecting device has a transparent materials as positioned in front of operator's eyes, a half-mirror and a projecting unit are provided on the transparent materials, the half-mirror is arranged at a position opposite to pupils of an operator, the projecting unit is arranged above the half-mirror, and so that the virtual reference plane is projected on the half-mirror by the projecting unit.

According to the present invention, a three-dimensional input device, which comprises two optical measuring means as set at a predetermined interval from each other, and for measuring a three-dimensional position of an object to be measured at a real time based on a direction of an object to be measured as obtained individually by the two optical measuring means and the Predetermined interval and also has a three-dimensional position detecting device which is capable of being mounted on a human body, and a control, unit, wherein the control unit generates input information based on change and mode of change of three-dimensional position of the object to be measured. As a result, it is not necessary to use an input tool such as a keyboard, a tablet, or the like, and an input operation can be performed at any place and further with no restriction on the place.

Further, according to the present invention, in the three-dimensional input device, the control unit sets up a virtual reference plane, and generates an input information based on change and mode of change of a three-dimensional position of the object to be measured with respect to the virtual reference plane. As a result, it is possible to improve a reliability of a judgment on the change of three-dimensional position and on the mode of change.

Further, according to the present invention, in the three-dimensional input, device, the control unit detects a body segment of human body, sets up working space by taking the body segment as a reference, and the virtual reference plane is set in said working space. As a result, the range to detect an object to be measured can be limited, and it is possible to easily identify the object to be measured.

Further, according to the present invention, in the three-dimensional input device, the object to be measured fulfills function as an input tool, a part of the input tool has such a color or a shape as identifiable from the other parts or being able to emit a light. As a result, it becomes easier to recognize the object to be measured and it is possible to improve a reliability of the measurement.

Further, according to the present invention, an input system comprises the three-dimensional input device and a display device, wherein the control unit displays a virtual reference plane on the display device and displays a positional information of the object to be measured with respect to the virtual, reference plane by overlapping on the virtual reference plane. As a result, an operator can visually confirm the condition of input operation and the condition of input and working efficiency is improved.

Further, according to the present invention, in the input system, the display device is designed as transmission type, the object to be measured as visually seen via the display device is overlapped on a virtual reference plane as displayed on the display device by the control unit, and the virtual reference plane and the object to be measured are associated with each other based on a three-dimensional position of the object to be measured as measured by the three-dimensional position detecting device. As a result, visual recognition becomes easier and working efficiency is improved.

Furthermore, according to the present invention, in the input system, in a case where a part where the object to be measured and a virtual, reference plane are overlapped on each other, a part where the virtual reference plane is overlapped is processed by hidden-line processing. As a result, visual recognition becomes easier and working efficiency is improved.

Furthermore, according to the present invention, in the input system, the three-dimensional position detecting device has a transparent materials as positioned in front of operator's eyes, a half-mirror and a projecting unit are provided on the transparent materials, the half-mirror is arranged at a position opposite to pupils of an operator, the projecting unit is arranged above the half-mirror, and so that the virtual reference plane is projected on the half-mirror by the projecting unit. As a result, it is possible to miniaturize an optical system of the three-dimensional position detecting device and to widen a visual field so that the restriction on the working range is reduced and the working efficiency is improved.

BRIEF DESCRIPTION OF THE DRAWINGS

FIG. 1A shows a two-dimensional display and FIG. 3B shows a three-dimensional display.

FIG. 8A is a perspective view and FIG. 8B is a side view.

DETAILED DESCRIPTION OF THE PREFERRED EMBODIMENT

In the present invention, it is so arranged that a virtual space is set up, and operating means such as key, keyboard, touch panel, or the like, are set up in the virtual space. Operation to be performed in a real space is measured by three-dimensionally, and the results of measurement are reflected in positional relationship with the operating means within the virtual space. Depending on as to whether operation or behavior in the real space is in contact with the operating means (or approaches to a predetermined distance), the input is performed.

That is, in the past, input operation has been performed in the real space and input has been performed based on physical contact to the operating means. In the present invention, it is designed so that input is carried out based on displacement of the operating means in the virtual space.

Description will be given below on an embodiment of the present invention by referring to the attached drawings.

Figure 1:
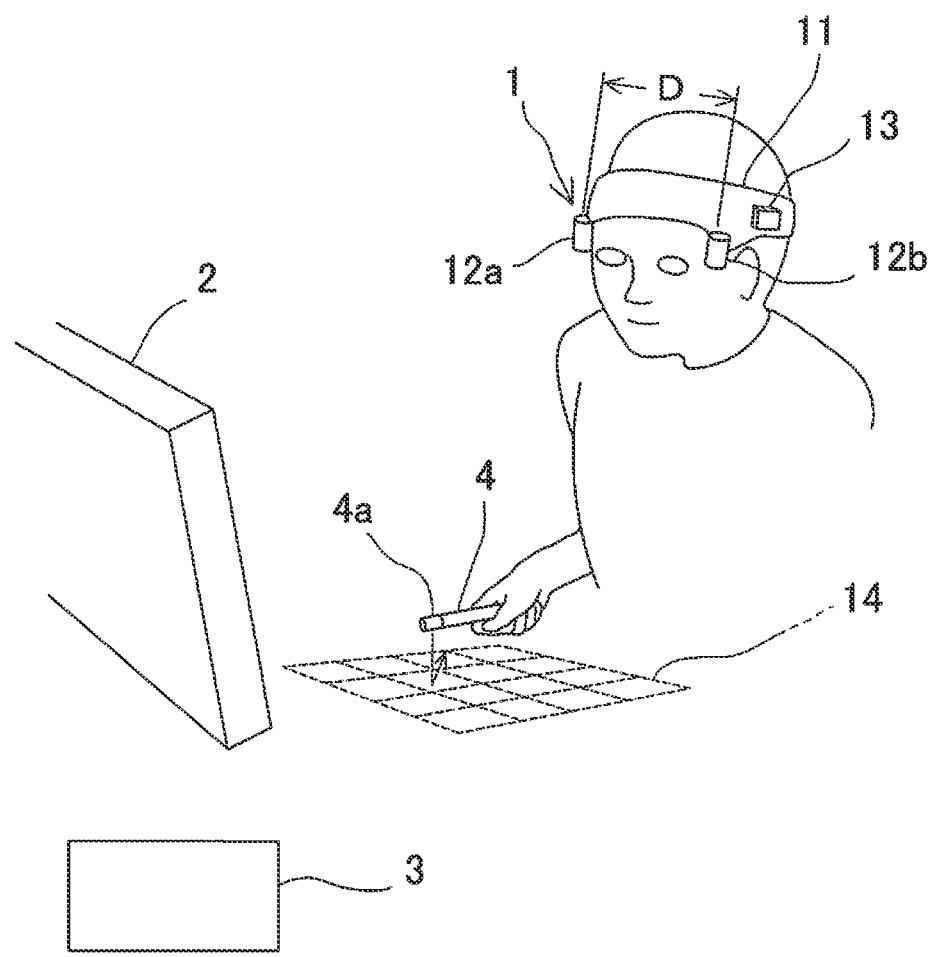
FIG. 1 is an explanatory drawing to show a first embodiment according to the present invention.

Referring to FIG. 1, description will be given on general features of a first embodiment of the present invention.

In FIG. 1, reference numeral 1 denotes a three-dimensional position detecting device 1 to be mounted on the head of an operator, reference numeral 2 denotes a display device, reference numeral 3 denotes a control device for detecting position of an object to be measured by the three-dimensional position detecting device 1 and for controlling display of the display device 2, and reference numeral 4 denotes an input tool as the object to be measured.

The input tool 4 has a tip portion 4a as a recognition unit. For the purpose of recognizing in easier manner, the tip portion 4a is in different colors compared with a main body of the input tool 4. Or, the tip portion 4a has a shape which is easily recognized. Or, the tip portion 4a is designed as being able to emit a light or being able to blink a light.

The three-dimensional position detecting device 1 is designed as mountable on the head of an operator, and the three-dimensional position detecting device 1 comprises a holder 11, optical measuring units 12a and 12b as optical measuring means, and a control, unit 13. The holder 11 can be mounted on the head of the operator, and two optical measuring units 12a and 12b and the control unit 13 are provided on the holder 11. The holder 11 holds the optical measuring units 12a and 12b at a known interval D so that optical axes of the optical measuring units 12a and 12b can be maintained in parallel, to each other.

The optical measuring units 12a and 12b can pick up an image which is around the hands of the operator, and have a field angle as being able to pick up an image of the working range of the operator. Further, direction of each of the optical measuring units 12a and 12b is set up so as to pick up an image which is around the hands of the operator.

The optical measuring units 12a and 12b have a photo-detection element, which is an assembly of pixels, e.g., a profile sensor, a position sensor or an image sensor, and each of the optical measuring units 12a and 12b, photodetecting position within the photodetection element or position of the object in the image can be specified.

The control unit 13 controls the optical measuring units 12a and 12b, and an image is acquired by the optical measuring units 12a and 12b. The image as acquired is transmitted to the control device 3 as image data.

The control device 3 identifies an object to be measured in the image based on the image data as received, e.g., a tip portion 4a of the input tool 4, and further, detects a position of the tip portion 4a within two images and calculates a direction of the object to be measured based on position of the tip portion 4a in the image. Further, the control device 3 measures three-dimensional position (i.e. three-dimensional coordinates) of the tip portion 4a by stereo-measurement based on the calculated direction and a known interval D between the optical measuring units 12a and 12b, i.e., stereo-method.

Further, the control device 3 detects a part of body in the image, e.g., shoulder, elbow, wrist, which is a body segment, and further calculates three-dimensional position of the body segment based on the image. Further, she control device 3 sets up a body segment as required, e.g., three-dimensional position of elbow, as a reference position of work of the operator. Further, based on the reference position, the working space is set up by the control device 3.

Further, the control device 3 sets up a virtual reference plane 14 as positioned in a predetermined relation with respect to a reference position. The virtual reference plane 14 is set up within a plane, which perpendicularly crosses optical axes of the optical measuring units 12a and 12b, and the virtual reference plane 14 is set up at a predetermined position by taking the reference position (three-dimensional position) as reference such as the position of the elbow of the operator. That is to say, the virtual reference plane 14 is set up at a position in a predetermined distance in downward direction or upward direction from the position of the elbow, and at a position in a predetermined distance in forward direction from the position of the elbow.

A part of the body, which can be a body segment, is a part, where no substantial displacement occurs during the working. By taking the body segment as the reference position, it is possible to stabilize the virtual reference plane 14. It is to be noted that the reference position can be set up at any position within the working space depending on the details of the work.

To the virtual reference plane 14, a function such as a function of a tablet terminal is given, for instance. When the tip portion 4a performs a predetermined operation with respect to the virtual reference plane 14, it is so arranged that signal or data are inputted.

Data as inputted, e.g., a letter is displayed on the display device 2, further, the virtual reference plane 14 and the tip portion 4a are displayed on the entire surface or on a part of the display device 2. Or, it is so arranged that operating condition of the tip portion 4a with respect to the virtual reference plane 14 is displayed on the display device 2.

Figure 2:
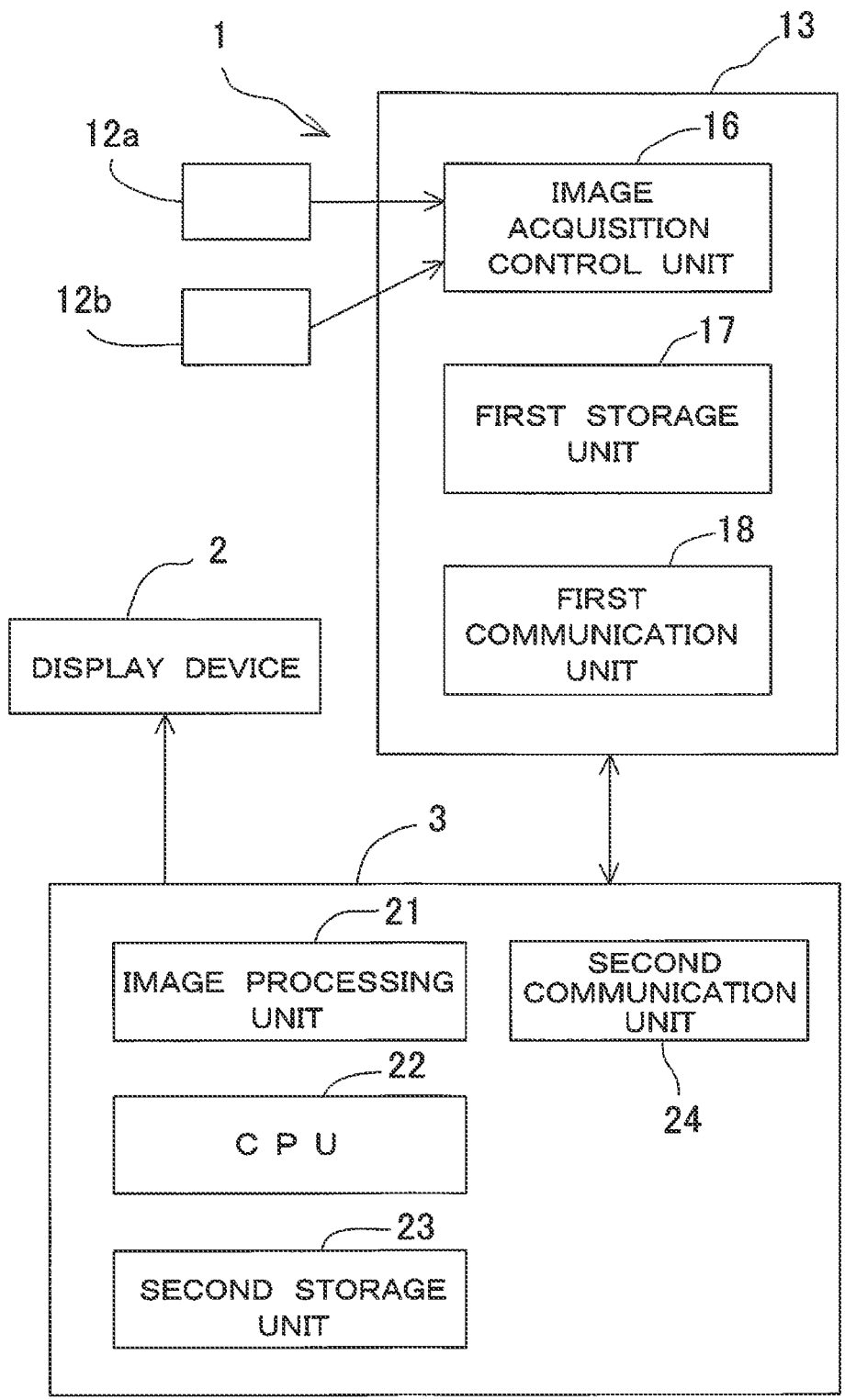
FIG. 2 is a block diagram to show approximate arrangement of the first embodiment.

Next, referring to FIG. 2, description will be given on approximate arrangement of the first embodiment.

As described above, the three-dimensional position detecting device 1 has the optical measuring units 12a and 12b provided on the holder 11 and the control unit 13.

The control unit 13 comprises an image acquisition control unit 16, a first storage unit 17, and a first communication unit 18.

The image acquisition control unit 16 controls acquisition of moving images of the optical measuring units 12a and 12b and performs synchronous control, and moving images acquired by each of the optical measuring units 12a and 12b are stored in the first storage unit 17. The first communication unit 18 transmits the stored moving images to the control device 3.

The control device 3 has an image processing unit 21, a central processing unit (CPU) 22, a second storage unit 23, and a second communication unit 24.

The image processing unit 21 acquires still image of each frame corresponding to each of the optical measuring units 12a and 12b from the moving images as transmitted from the control unit 13, extracts image of the object to be measured in the still images, e.g., image of the tip portion 4a of the input tool 4. Further, still image is continuously acquired at frame rate (e.g. 1/30 second interval (30 fps)) of the moving image, and image extraction of the object to be measured, e.g. the tip portion 4a and body segment, is carried out based on each of two images as acquired.

The moving image, the still image, and the image of the objet to be measured are stored in the second storage unit 23.

In the second storage unit 23, various types of programs are stored including an image processing program for making the image processing unit 21 execute image processing, a measurement program for measuring three-dimensional position of the object to be measured from the still image, a reference plane forming program for forming the virtual reference plane 14, an input detecting program for calculating a correlation of images between the virtual reference plane 14 and the tip portion 4a, and for detecting input condition by the input tool 4 based on the result of the calculation, a display program for giving image display on the display device 2, and a communication program for executing communication to and from the control unit 13, or the like, and further, various types of programs for displaying on the display device 2 are stored.

The second communication unit 24 gives image data to and takes image data from the first communication unit 18 and also gives and takes data of three-dimensional position via the means as required such as wired or wireless communication means or the like.

In the following, description will be given on an operation of the present embodiment.

The central processing unit 22 calculates three-dimensional position (three-dimensional coordinates) of an object to be measured in the image, e.g., the tip portion 4a and the body segment, based on two still images acquired by the optical measuring units 12a and 12b. Further, when the central processing unit 22 calculates three-dimensional coordinates of the object to be measured from the still image as continuously acquired, three-dimensional coordinates of the object to be measured can be obtained at real time.

In this case, a reference position of the three-dimensional position (i.e. an origin point of the three-dimensional coordinates) is set at the center between the two optical measuring units 12a and 12b or the like. Further, the control unit 13 detects a part, to be the body segment, e.g. an elbow, from the image picked up by the two optical measuring units 12a and 12b, calculates the three-dimensional position of the elbow, and regards the three-dimensional position of the elbow as a reference position of the work of the operator.

The central processing unit 22 calculates a position to form the virtual reference plane 14 by taking the three-dimensional coordinates of the elbow as reference, and forms the virtual reference plane 14 at a position of formation as calculated.

The central processing unit 22 calculates three-dimensional coordinates of the tip portion 4a, and further, calculates positional relation between the virtual reference plane 14 and the tip portion 4a, and displays the positional relation on the display device 2.

The operator operates the input tool 4 while observing the display on the display device 2. For instance, the operator taps the virtual reference plane 14 virtually by the input tool 4 and carries out an input operation with respect to the virtual reference plane 14.

The central processing unit 22 calculates a positional change and a mode of change of the tip portion 4a with respect to the virtual reference plane 14 and judges whether or not the positional change and the mode of change are the predetermined changes. The positional change and the mode of change as judged by the central processing unit 22 are the positional changes of the tip portion 4a with respect to the virtual reference plane 14 and the changes of acceleration of the tip portion 4a, or the like.

As the predetermined change of the positional change and the mode of change, e.g., whether the tip portion 4a passes through with respect to the virtual reference plane 14, and it is judged that the moment of passing through is the moment when the input operation is done. The central processing unit 22 judges as to at which position of the virtual reference plane 14 the tip portion 4a tapped, and an input information (an input signal) corresponding to the position of the virtual reference plane 14 is generated.

Further, it may be arranged in such manner that when the tip point 4a passes through the virtual, reference plane 14, sound is rung so that the operator can confirm that the operation has been inputted or not. Further, a vibrator may be incorporated in the input tool 4 so that when there is an input, the vibrator is vibrated.

Further, as the mode of change, there is a change of moving direction of the input tool 4. Based on the result of measurement by the three-dimensional position detecting device 1, the central processing unit 22 detects a direction of moving of the input tool 4, and input is executed based on the change in the direction of moving. In this case, the virtual reference plane 14 does not need to be used.

Further, the central processing unit 22 performs signal processing corresponding to the input signal, and for instance, if the input signal is an input of a character, the input signal is converted to a character signal and the character signal is displayed on the display device 2.

Further, as a method to display on the display device 2, a two-dimensional display and a Three-dimensional display can be adequately selected.

Figure 3A:
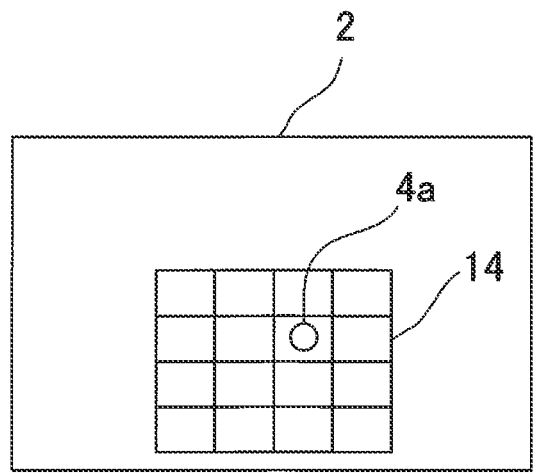
FIG. 3A and FIG. 3B represent display examples of the first embodiment.

FIG. 3A shows an example of the two-dimensional display.

On a part of display surface of the display device 2, the virtual reference plane 14 is displayed. Further, positional information of the tip portion 4a is displayed as a point on the virtual reference plane 14 by overlapping.

The point is displayed by associating with the virtual reference surface 14 based on three-dimensional position of the tip portion 4a as measured by the three-dimensional position detecting device 1.

In order that positional relation with the virtual reference plane 14 (i.e. positional relation in approaching and separating directions) can be discriminated further, in a case where the tip portion 4a is positioned on this side of the virtual reference plane 14, the tip portion 4a is indicated by a mark ⊚. In a case where the tip portion 4a is coincident with the virtual reference plane 14, the tip portion 4a is indicated by a mark ○. In a case where the tip portion 4a is at the rear of the virtual reference plane 14, the tip portion 4a is indicated by a mark ●. It is to be noted that the marks are given above as examples, and various type of symbol or mark can be used. Further, the input position may be displayed in different colors.

Figure 3B:
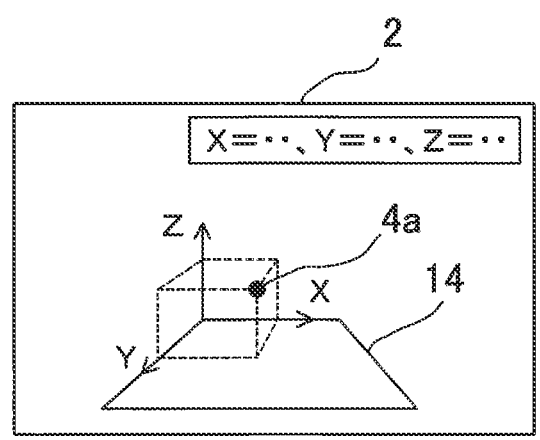

FIG. 3B shows an example of the three-dimensional display.

In the figure, three-dimensional coordinate system is displayed on the virtual reference plane 14, and the tip portion 4a is displayed as a point in the coordinate system. Further in this case, three-dimensional coordinate values (X, Y, Z) may be displayed together. In a case where the tip point 4a is displayed three-dimensionally, two-dimensional, position in the virtual reference plane 14 and the position in approaching and separating directions with respect to the virtual reference plane 14 are displayed at the same time.

Figure 4A:
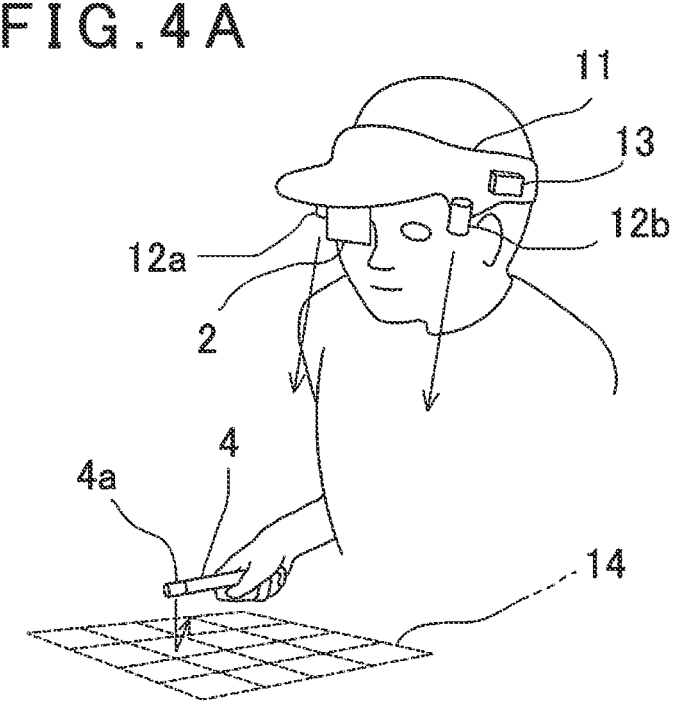
FIG. 4A and FIG. 4B are explanatory drawings to show a second embodiment according to the present invention.
Figure 4B:
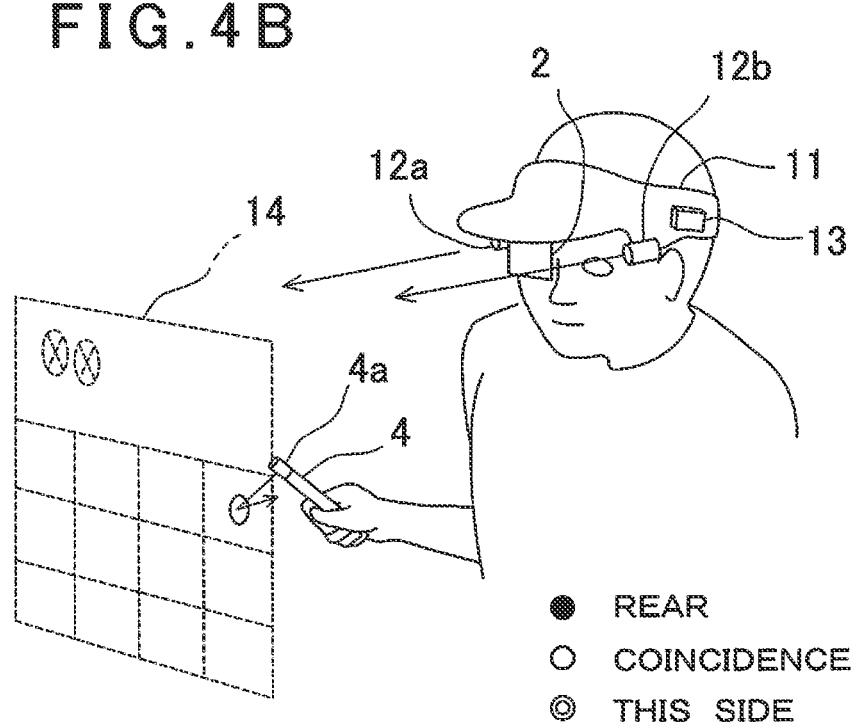

Each of FIG. 4A and FIG. 4B shows a second embodiment. It is to be noted that in FIG. 4A and FIG. 4B, the same component as shown in FIG. 1 is referred by the same symbol, and the details are not given here.

In the second embodiment, a display device 2 is designed as a head-mounted type.

The holder 11 may be a cap, a sun visor, a helmet, or the like and the holder 11 is mounted on the head of an operator. The display device 2 is provided on the holder 11, and the display device 2 is provided in front of one of the eyes of the operator.

Therefore, the operator watches the display device 2 by one of the eyes, sees the input tool 4 by the other eye, and input operation is performed. In this case, the operator has no need to hold a tool such as a tablet and can operate by one hand.

Further, in the second embodiment, the optical measuring units 12a and 12b to be provided on the holder 11 can be interlocked because the optical axes are kept in parallel, to each other, and image-pickup directions of the optical measuring units 12a and 12b can be changed.

In the condition as shown in FIG. 4A, a case where the virtual reference plane 14 is formed in lower position is shown and the optical measuring units 12a and 12b are designed so as to acquire the images including around hands of the operator.

A control unit 13 provided on the holder 11 also has the functions of both the control device 3 and the control unit 13 in the first embodiment, forms the virtual reference plane 14 in lower position and calculates three-dimensional coordinates of the tip portion 4a based on the images acquired by the optical measuring units 12a and 12b.

The control unit 13 calculates the mode of change of the tip portion 4a with respect to the virtual reference plane 14 and also calculates whether there is an input or not and an input condition by the tip portion 4a.

Further, the control unit 13 controls so that the virtual reference plane 14 and the tip portion 4a are displayed on the display device 2. The operator performs input operation while watching the images as displayed on the display device 2 and also by watching the tip portion 4a. The details to be displayed on the display device 2 are the same as the details shown in FIG. 3A and FIG. 3B.

FIG. 4B shows a case where the virtual reference plane 14 is formed in forward direction (i.e. in the direction of the line of sight), and it is so arranged that the optical measuring units 12a and 12b can acquire images including around the hands of the operator in forward direction.

In the case as shown in FIG. 4B, optical axes of the optical measuring units 12a and 12b are approximately aligned with the operator's line of sight, and the virtual reference plane 14 is formed at forward position and in vertical or approximately vertical condition. Further, the position where the virtual, reference plane 14 is formed is determined based on the three-dimensional coordinates of a body segment such as an elbow or the like, and the virtual reference plane 14 is fixed at the position thus determined.

The virtual reference plane 14 is displayed on the display device 2. The operator watches the virtual reference plane 14 by one eye, and the input, tool 4 by the other eye. Then, the virtual reference plane 14 is pushed or tapped or the like by input operation by the input tool 4 so that the input, is performed.

Further, it may be so arranged that the marks such as ◉, ○ and ● are displayed on the virtual reference plane 14 similarly to the case of the first embodiment to indicate the positional relation between the virtual reference plane 14 and the tip portion 4*a*.

Figure 5:
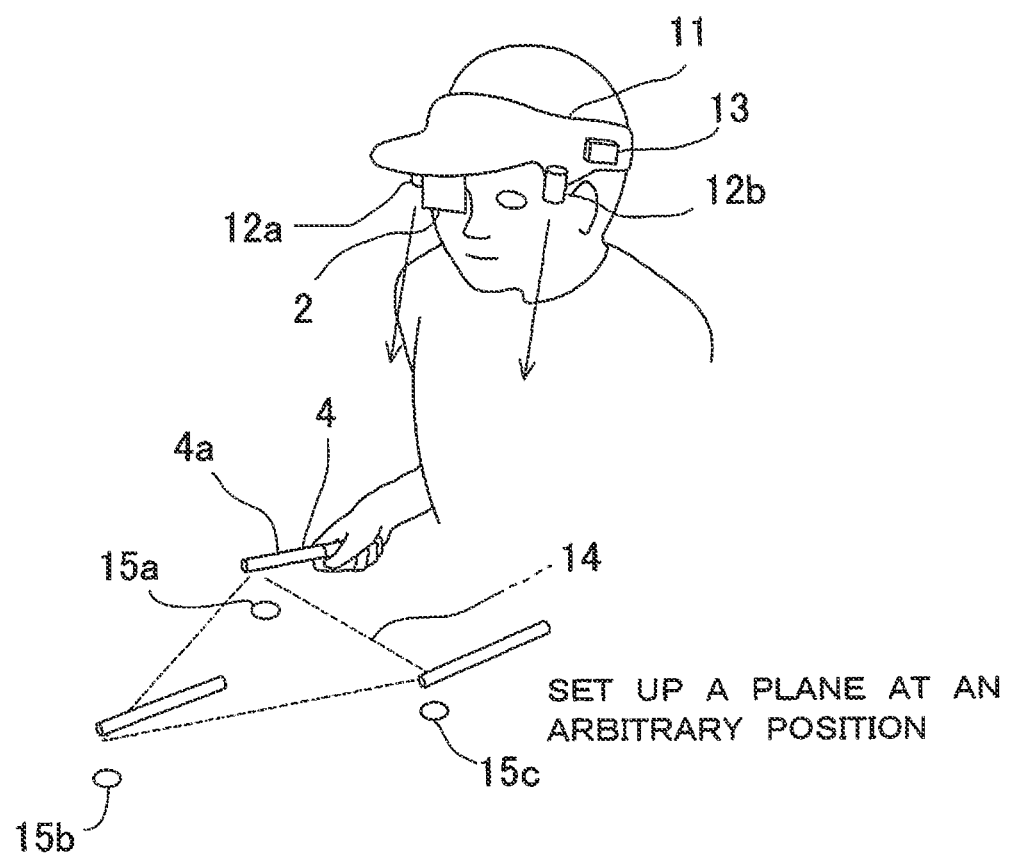
FIG. 5 is an explanatory drawing of the setting of a reference plane.

The virtual reference plane 14 is automatically formed by the control unit 13 by taking the body segment of the operator as required and the optical axes of the optical measuring units 12*a* and 12*b* or the like as reference. Or, the operator may arbitrarily set up or the setting may be changed. For instance, as shown in FIG. 5, three points at adequate positions are designated by using the input tool 4 and a plane can be defined by the three points, and the virtual, reference plane 14 is formed with graphical center of the three points as reference. Further, it may be so arranged that after the plane has been defined by using the three points 15*a*, 15*b* and 15*c* a fourth point is designated by the input tool 4 further, and reference position (e.g. the center) of the virtual reference plane 14 may be set up by the fourth point.

Figure 6:
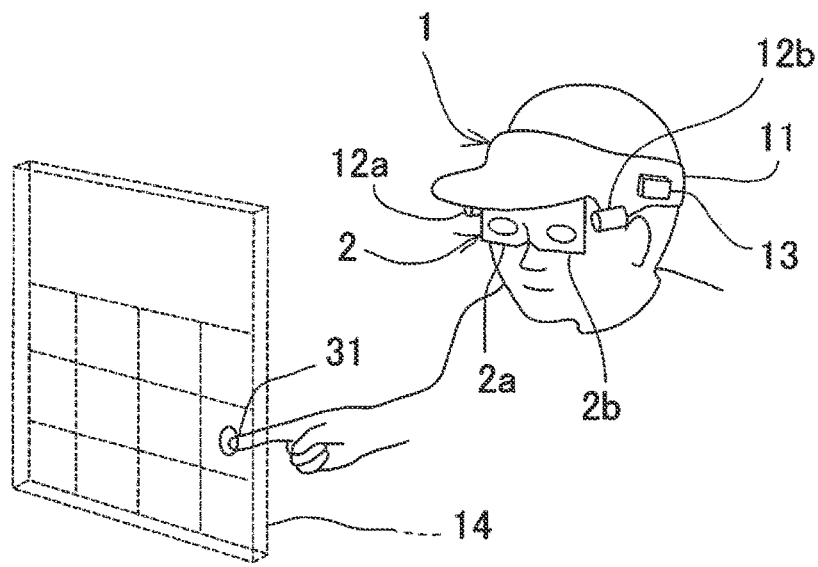
FIG. 6 is an explanatory drawing to show a third embodiment according to the present invention.

FIG. 6 shows the third embodiment. It is to be noted that in FIG. 6, the same component as shown in FIG. 1 is referred by the same symbol, and detailed description will not be given here.

In a third embodiment, a case is shown where a head-mounted type of three-dimensional position detecting device 1 is used. Further, the display device 2 is designed in a transmission type (see-through type) so that stereoscopic observation can be accomplished.

The display device 2 has transmission type display units 2*a* and 2*b* at left and right as to correspond to left and right eyes respectively. It is so arranged that virtual reference planes 14*a* and 14*b* (not shown) are displayed respectively on the transmission type display units 2*a* and 2*b*. The control unit 13 controls display of the transmission type display units 2*a* and 2*b* and controls acquisition of the images by the optical measuring units 12*a* and 12*b* at left and right.

Figure 7:
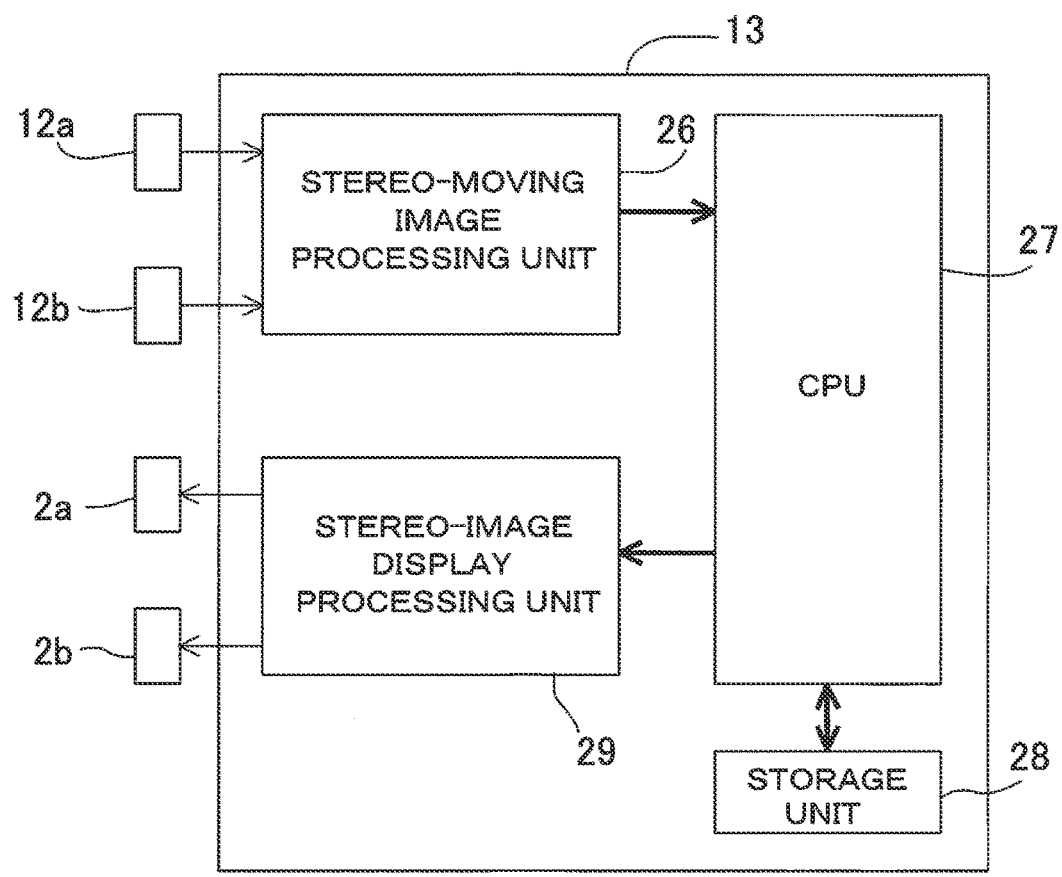
FIG. 7 is a block diagram to show approximate arrangement of the third embodiment.

By referring to FIG. 7, description will be given below on general features of the arrangement of the third embodiment.

The control unit 13 has a stereo-moving image processing unit 26, a central processing unit 27, a storage unit 28, and a stereo-image display processing unit 29.

The optical measuring units 12*a* and 12*b* are controlled so that moving images can be acquired in synchronization respectively, and the moving images thus acquired are in putted to the stereo-moving image processing unit 26. At the stereo-moving image processing unit 26, the moving images as picked up individually at the optical measuring units 12*a* and 12*b* are associated and are processed to stereo-moving images. The stereo-moving images are stored in the storage unit 28.

The central processing unit (CPU) 27 prepares a left moving image and a right moving image to be displayed on the transmission type display units 2*a* and 2*b* from the stereo-moving images and sends out the left moving image and the right moving image to the stereo-image display processing unit 29. At the stereo-image display processing unit 29, the left moving image and the right moving image are synchronized, and displayed on the transmission type display units 2*a* and 2*b* respectively.

The left moving image and the right moving image have a parallax. By visually confirming the left moving image and the right moving image individually from left and right eyes, the object to be measured within the image is recognized as a stereoscopic moving image.

Further, image data for the virtual reference plane 14 is stored in the storage unit 28. The image data has the virtual reference plane 14*a* (not shown) for left image and the virtual reference plane 14*b* (not shown) for right image, and the virtual reference plane 14*a* and the virtual reference plane 14*b* have the parallax.

The stereo-image display processing unit 29 displays the virtual reference planes 14*a* and 14*b* on the transmission type display units 2*a* and 2*b* respectively. Because the virtual reference planes 14*a* and 14*b* have the parallax, the virtual reference planes 14*a* and 14*b* are recognized as a stereoscopic virtual reference plane 14. The virtual reference planes 14 and the stereoscopic moving images are overlapped and displayed. Further, in a case where the virtual reference plane 14 and the stereoscopic moving images are overlapped and displayed, if the object to be measured is on this side of the virtual reference plane 14, the virtual reference plane 14 where the object to be measured is overlapped is not displayed. Hidden-line processing may be performed.

Further, the displays of the transmission type display units 2*a* and 2*b* are so controlled that the virtual reference plane 14 is formed at a regular position with taking a body segment such as an elbow as reference, and even in a case where there is change on the position of a head, it is so arranged that this change does not exert influence on the display position of the virtual reference plane 14.

The central processing unit 27 acquires still images at a predetermined time interval from the left moving image and the right moving image and processes the still image as stereo-images. The object to be measured is extracted from the still images, and the three-dimensional coordinates of the object to be measured are calculated.

Next, description will be given on an input operation with respect to the virtual reference plane 14.

Similarly to the description as given above, the input operation may be performed by using the input tool 4 or by using fingers. Further, because the operator has no need to hold a tool such as a tablet or the like, the operator can perform one-hand operation.

The optical measuring units 12*a* and 12*b* acquire the images including the fingers respectively, and three-dimensional measurement of finger tip 31 is carried out based on the images as acquired. It is to be noted that as the optical measuring units 12*a* and 12*b*, an image sensor is used so that the finger tip 31 can be identified.

The three-dimensional coordinates of the finger tip 31 are calculated at the control unit 13, further positional relation between the finger tip 31 and the virtual reference plane 14 is calculated.

Positional relation between the position of the finger tip 31 and the virtual reference plane 14 is calculated at real time, and it is judged as to whether there has been input or not, depending on the change of the finger tip 31 with respect to the virtual reference plane 14.

The changes of the finger tip 31 with respect to the virtual reference plane 14 are displayed on the virtual reference plane 14 as symbol or mark corresponding to the position.

As an example of the symbol or the mark to be displayed, the one shown in FIG. 3 may be used.

Further, contact portion between the virtual reference plane 14 and the finger tip 31 may be changed in order to correspond to the change of the finger tip 31 with respect to the virtual reference plane 14. For instance, in a case where the finger tip 31 moves in forward direction beyond the virtual reference plane 14, contact portion is indented.

In order to confirm whether there has been input or not, in a case where the finger tip 31 coincides with the virtual reference plane 14 or in a case where the finger tip 31 goes beyond the virtual reference plane 14, it may be so arranged that announcement sound is rung.

Figure 8A:
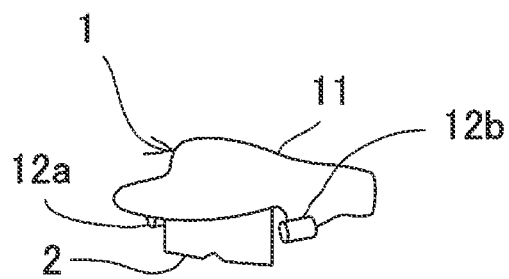
FIG. 8A and FIG. 8B are explanatory drawings to show variation examples of a three-dimensional position detecting device of the third embodiment.
Figure 8B:
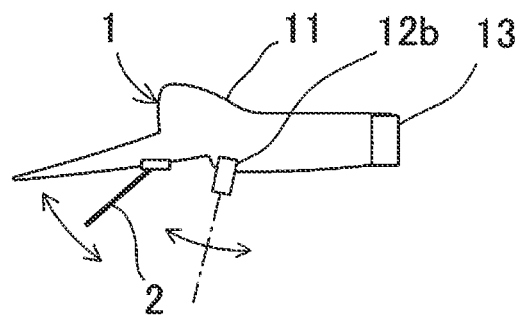

FIG. 8A and FIG. 8B show variation examples of the three-dimensional position detecting device 1.

It is designed so that the three-dimensional position detecting device 1 can be head-mounted. The three-dimensional position detecting device 1 has a display device 2 which is a transmission type so that the display device 2 is rotated around the upper end and display device 2 can be folded and stored. Further, the optical measuring units 12a and 12b are so arranged that the image pickup direction (i.e. direction of optical axis) can be chanced, depending on the input position. The image pickup direction is changed to downward direction in case of the operation around hand, and the image pickup direction is changed to horizontal direction in a case where the working is done at a forward point. Further, because the virtual reference plane 14 can be set to any position as suitable for the work, freedom of the input operation is increased and the freedom to use is improved.

Figure 9A:
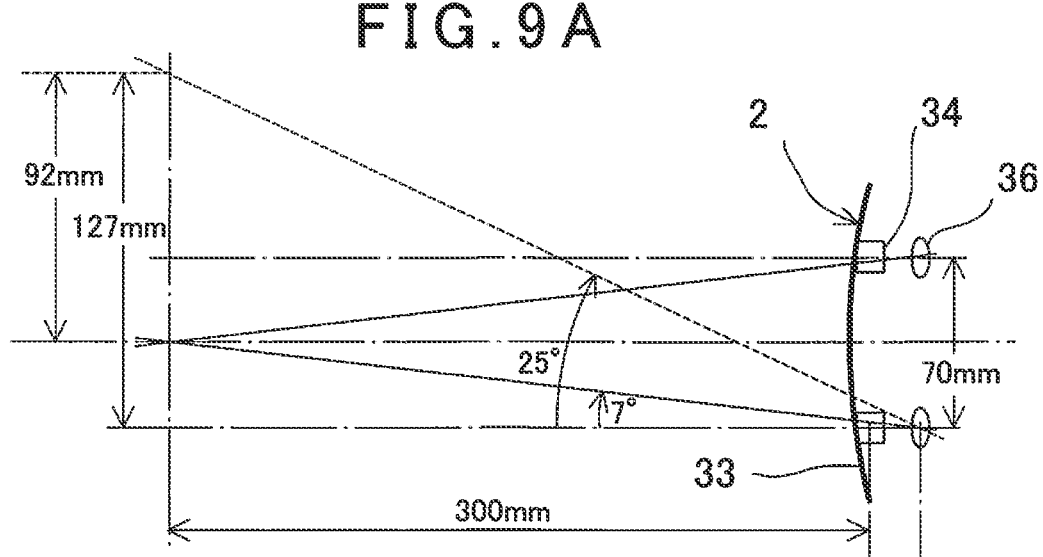
FIG. 9A and FIG. 9B are schematic views to show an example of an optical system of the three-dimensional position detecting device.
Figure 9B:
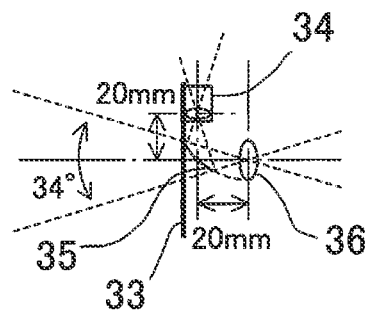

Each of FIG. 9A and FIG. 9B show an example of optical system of the three-dimensional position detecting device 1.

In FIG. 9B and FIG. 9B, reference numeral 33 denotes a transparent material, reference numeral 34 denotes a projecting unit, reference numeral 35 denotes a half-mirror, and reference numeral 36 denotes a pupil of the operator.

The transparent materials 33 is supported by a holder 11 (see FIG. 8A and FIG. 8B), and the projecting unit 34 and the half-mirror 35 are provided on the holder 11.

The half-mirror 35 is provided on optical axis of the pupil 36 just in front of the pupil 36. The projecting unit 34 is arranged above the half-mirror 35 so that the optical axis of the projecting unit 34 crosses the optical axis of the pupil 36 on she half-mirror 35, and the projecting unit 34 and the pupil 36 are set in conjugate relation to each other.

The projecting unit 34 projects the virtual, reference plane 14 on the half-mirror 35. The operator visually confirms the object to be measured through the half-mirror 35 and the transparent material 33 while visually confirming the virtual reference plane 14 on the half-mirror 35. The operator recognizes that the virtual reference plane 14 and the object to be measured in overlapped condition.

By arranging the half-mirror 35 just in front of the pupil 36, it is possible to obtain a large field angle by the half-mirror 35 which is small. Therefore, the half-mirror 35 and the projecting unit 34 can be designed in smaller size.

Further, the direction of line of sight (i.e. direction of optical axis of the pupil 36) is changed in a case where the object to be measured at near distance is visually confirmed, and in a case where the object to be measured at long distance is visually confirmed. Therefore, by arranging the half-mirror 35 for near distance and for long distance and by changing the virtual reference plane 14 and the projecting unit 34 for projecting for near distance and for long distance, it is possible to perform input operation within the reach of operator's hand while visually confirming the object to be measured at long distance. For instance, this can be performed in a case where a flying vehicle flying at long distance is remotely controlled on the virtual reference plane 14 within the reach of operator's hand or the like.

It is to be noted that in the input system as described above, it may be so arranged that a laser scanner is used as one of the two optical measuring units and a profile sensor, a position sensor or an image sensor is used as the other of the optical measuring units. In a case where the laser scanner is used as one of the two optical measuring units, the direction of and the distance to the object to be measured can be promptly measured, and measuring speed for the three-dimensional measurement is improved.

The invention claimed is:

1. An input system comprising a three-dimensional position detecting device, which has two optical measuring means as set at a predetermined interval from each other, for measuring a three-dimensional position of an object to be measured at a real time based on a direction of an object to be measured as obtained individually by said two optical measuring means and said predetermined interval and capable of being mounted on a human body, and a control unit, wherein said control unit sets up a virtual reference plane, and generates an input information based on change and mode of change of a three-dimensional position of said object to be measured with respect to said virtual reference plane, wherein said control unit detects a body segment of human body, sets up working space with reference to said body segment, and said virtual reference plane is set in said working space, wherein said control unit displays said virtual reference plane on a display device and displays a positional information of said object to be measured with respect to said virtual reference plane by overlapping on said virtual reference plane, wherein said display device is capable of being mounted on human body together with said three-dimensional position detecting device, and wherein said display device is designed as transmission type, said object to be measured as visually seen via said display device is overlapped on said virtual reference plane as displayed on said display device by said control unit, and said virtual reference plane and said object to be measured are associated with each other based on a three-dimensional position of said object to be measured as measured by said three-dimensional position detecting device.

2. An input system according to claim 1, wherein a three-dimensional position measurement of said object to be measured is executed within said working space.

3. An input system according to claim 1, wherein said object to be measured fulfills the function as an input tool, a part of said input tool has such a color or a shape as identifiable from the other part of said input tool, or is capable of emitting a light.

4. An input system according to claim 1, wherein display on said display device is 3D display.

5. An input system according to claim 1, wherein in a case where a part where said object to be measured and a virtual reference plane are overlapped on each other, a part where said virtual reference plane is overlapped is processed by hidden-line processing.

6. An input system according to claim 1, wherein said three-dimensional position detecting device is capable of being mounted on a head of an operator, and said display device is designed so that said display device is capable of being folded and stored.

7. An input system according to claim 1, wherein said three-dimensional position detecting device has a transparent materials as positioned in front of operator's eyes, a half-mirror and a projecting unit are provided on said transparent materials, said half-mirror is arranged at a position opposite to pupils of an operator, said projecting unit is arranged above said half-mirror, and so that said virtual reference plane is projected on said half-mirror by said projecting unit.

\* \* \* \* \*